US012096197B2

(12) United States Patent
Li et al.

(10) Patent No.: US 12,096,197 B2
(45) Date of Patent: Sep. 17, 2024

(54) VOICE COIL FOR SOUND PRODUCING DEVICE AND SOUND PRODUCING DEVICE

(71) Applicant: GOERTEK INC., Shandong (CN)

(72) Inventors: Xiang Li, Shandong (CN); Dong Wang, Shandong (CN); Zhiyong Dong, Shandong (CN)

(73) Assignee: GOERTEK INC., Weifang (CN)

( * ) Notice: Subject to any disclaimer, the term of this patent is extended or adjusted under 35 U.S.C. 154(b) by 183 days.

(21) Appl. No.: 17/790,226

(22) PCT Filed: Nov. 6, 2020

(86) PCT No.: PCT/CN2020/126969

§ 371 (c)(1),
(2) Date: Jun. 30, 2022

(87) PCT Pub. No.: WO2021/135640

PCT Pub. Date: Jul. 8, 2021

(65) Prior Publication Data

US 2023/0049668 A1 Feb. 16, 2023

(30) Foreign Application Priority Data

Dec. 30, 2019 (CN) ........................ 201911395185.X

(51) Int. Cl.
*H04R 9/00* (2006.01)
*H04R 9/04* (2006.01)
*H04R 9/06* (2006.01)

(52) U.S. Cl.
CPC ............... *H04R 9/06* (2013.01); *H04R 9/046* (2013.01)

(58) Field of Classification Search
CPC ..... H04R 9/00; H04R 29/003; H04R 2209/00
(Continued)

(56) References Cited

U.S. PATENT DOCUMENTS 3,267,968 A * 8/1966 Foll ........................ H04R 9/046 29/607
3,707,693 A * 12/1972 Hatton ...................... H01F 5/02 428/188
(Continued)

FOREIGN PATENT DOCUMENTS

CN 202143203 U 2/2012
CN 104053095 A 9/2014
(Continued)

OTHER PUBLICATIONS

International Search Report from International Application No. PCT/CN2020/126969 mailed Jan. 27, 2021.

*Primary Examiner* — Suhan Ni
(74) *Attorney, Agent, or Firm* — Shih IP Law Group, PLLC

(57) ABSTRACT

Disclosed are a voice coil for a sound producing device and a sound producing device, the sound producing device comprises a voice coil body and a reinforcing portion; the voice coil body comprises a voice coil framework and a voice coil wire; the reinforcing portion comprises a first reinforcing portion and a second reinforcing portion; the first reinforcing portion is provided on the inner side of the voice coil framework, and the second reinforcing portion is provided on the outer side of the voice coil framework; and the reinforcing portion is configured to enhance the strength of the voice coil at high frequencies. Both the inner side and the outer side of the voice coil framework are provided with the reinforcing portions, thereby preventing the voice coil framework from deforming towards the side with lower strength because the strength of one side of the voice coil framework is relatively low.

8 Claims, 3 Drawing Sheets

(58) Field of Classification Search
USPC .................................................. 381/407–408
See application file for complete search history.

(56) References Cited

U.S. PATENT DOCUMENTS

| | | | | |
|---|---|---|---|---|
| 3,963,882 | A * | 6/1976 | Lewis .................... | H04R 9/046<br>335/250 |
| 4,225,756 | A * | 9/1980 | Babb ........................ | H04R 7/20<br>381/396 |
| 4,869,765 | A * | 9/1989 | Shimizu ................. | H04R 9/046<br>156/203 |
| 2015/0003661 | A1 * | 1/2015 | Shinotsuka ............ | H04R 15/00<br>381/398 |
| 2018/0288531 | A1 | 10/2018 | Kagawa et al. | |

FOREIGN PATENT DOCUMENTS

| | | | |
|---|---|---|---|
| CN | 106162462 | A | 11/2016 |
| CN | 206894889 | U | 1/2018 |
| CN | 111083613 | A | 4/2020 |
| CN | 211089949 | U | 7/2020 |

* cited by examiner

VOICE COIL FOR SOUND PRODUCING DEVICE AND SOUND PRODUCING DEVICE

TECHNICAL FIELD

The present disclosure relates to a technical field of acoustic-electro conversion, and more particularly, the present disclosure relates to a voice coil for a sound producing device and a sound producing device.

BACKGROUND ART

A loudspeaker is a transducer device that converts electrical signals into sound signals. Audio electrical energy causes the cone or diaphragm to vibrate and resonate with the surrounding air to produce sound through electromagnetic, piezoelectric or electrostatic effects. The loudspeaker is the weakest device in the audio equipment, and is also the most important device for the sound effect.

The voice coil can be considered as the core of the loudspeaker, and the performance of the voice coil will affect the sound pressure frequency characteristics, sound pressure level, impedance curve, distortion, transient characteristics, loudspeaker parameters, sound quality, etc., and it especially concerns to the power withstand and life of the loudspeaker.

The voice coil framework in the prior art is generally made of a single layer of aluminum magnesium alloy or polyimide film, and the outer side of the voice coil is additionally provided with a structure such as a layer of reinforcing paper to increase the strength of the voice coil. However, the voice coil framework having such structure has poor strength, and correspondingly affects the high frequencies acoustic performance of the loudspeaker.

SUMMARY OF THE INVENTION

An object of the present disclosure is to provide a voice coil for a sound producing device and a sound producing device.

According to a first aspect of the present disclosure, there is provided a voice coil for a sound producing device, comprising:

- a voice coil body including a voice coil framework and a voice coil wire wound on an outer side of the voice coil framework; and
- a reinforcing portion including a first reinforcing portion disposed on an inner side of the voice coil framework and a second reinforcing portion disposed on the outer side of the voice coil framework,
- wherein the reinforcing portion is configured to enhance a strength of the voice coil at high frequencies.

Optionally, a width of the first reinforcing portion in the axial direction of the voice coil framework is $h_1$, and the $h_1$ is 5%-30% of an axial width of the voice coil framework.

Optionally, a width of the second reinforcing portion in the axial direction of the voice coil framework is $h_2$, and the $h_1$ is the same as the $h_2$ or different from the $h_2$.

Optionally, the first reinforcing portion and the second reinforcing portion are symmetrically disposed on both sides of the voice coil framework.

Optionally, the difference between a height of the first reinforcing portion and a height of the second reinforcing portion in the axial direction of the voice coil framework is $h_3$, and the $h_3$ is 5%-80% of the $h_1$.

Optionally, material of the reinforcing portion is one or more of aluminum magnesium alloy, polyimide film, glass fiber and glue.

Optionally, material of the first reinforcing portion is the same as that of the second reinforcing portion.

Optionally, the first reinforcing portion is disposed in an annular shape.

Optionally, a plurality of through holes are disposed on the side wall of the voice coil framework, and the plurality of through holes are uniformly disposed around the voice coil framework.

According to a second aspect of the present disclosure, there is provided a sound producing device, comprising:

- a housing and a vibration assembly positioned in the housing,
- wherein the vibrating assembly includes a diaphragm and the voice coil connected to the diaphragm.

Compared with the prior art, the present disclosure has the following technical effects.

The present disclosure discloses a voice coil for a sound producing device, comprising: a voice coil body including a voice coil framework and a voice coil wire wound on an outer side of the voice coil framework, and a reinforcing portion including a first reinforcing portion disposed on an inner side of the voice coil framework and a second reinforcing portion disposed on the outer side of the voice coil framework, wherein the reinforcing portion is configured to enhance the strength of the voice coil at high frequencies. The present disclosure achieves the enhancement of the strength of the voice coil at high frequencies by disposing the reinforcing portions on both the inner side and outer side of the voice coil framework.

Through the following detailed description of the exemplary embodiments of the present disclosure with reference to the accompanying drawings, other features and advantages of the present disclosure will become clear.

BRIEF DESCRIPTION OF THE DRAWINGS

The accompanying drawings incorporated into and constituting a part of the specification illustrate embodiments of the present disclosure and are used to explain the principle of the present disclosure together with its descriptions thereof.

DESCRIPTION OF REFERENCE NUMERALS

1—voice coil framework; 2—first reinforcing portion; 3—second reinforcing portion; 4—through hole; 5—voice coil wire.

DETAILED DESCRIPTION OF EMBODIMENTS

Various exemplary embodiments of the present disclosure will now be described in detail with reference to the accompanying drawings. It should be noted that the relative arrangement, numerical expressions and values of the parts and steps described in these embodiments do not limit the scope of the present disclosure unless otherwise specified.

The following description of at least one exemplary embodiment is actually merely illustrative and is in no way intended to limit the present disclosure and the application or uses thereof.

The technologies, methods and devices known to those skilled in the art may not be discussed in detail, but such techniques, methods, and apparatus should be considered a part of the specification according to appropriate circumstance.

In all examples illustrated and described herein, any specific values should be construed as illustrative only instead of limitation. Accordingly, other instances of the exemplary embodiment may have different values.

It should be noted that like reference numbers and letters refer to like items in the following drawings, therefore once a certain item is defined in one drawing, it does not require further explained in subsequent figures.

Figure 1:
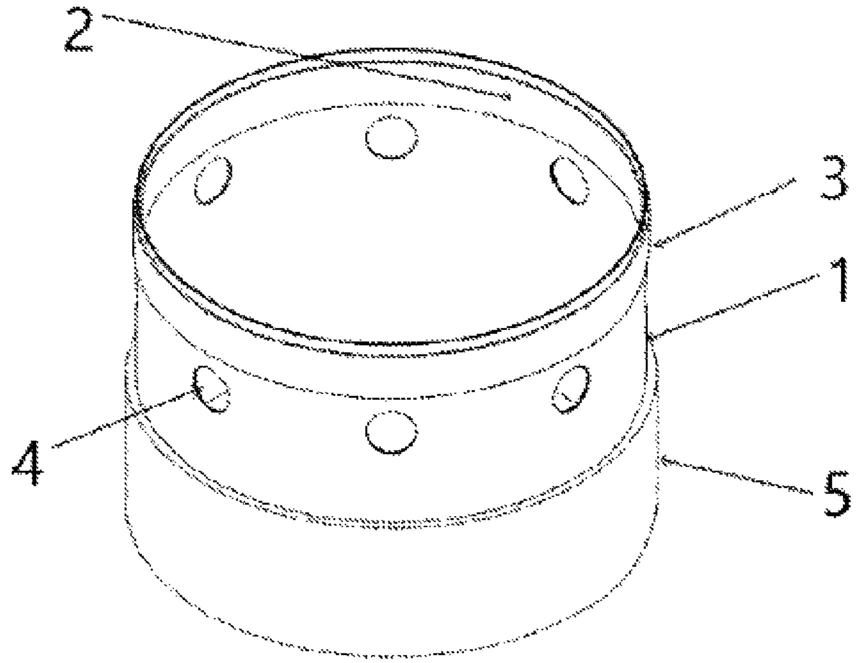
FIG. 1 is a schematic diagram of a structure of a voice coil for a sound producing device according to an embodiment of the present disclosure.
Figure 2:
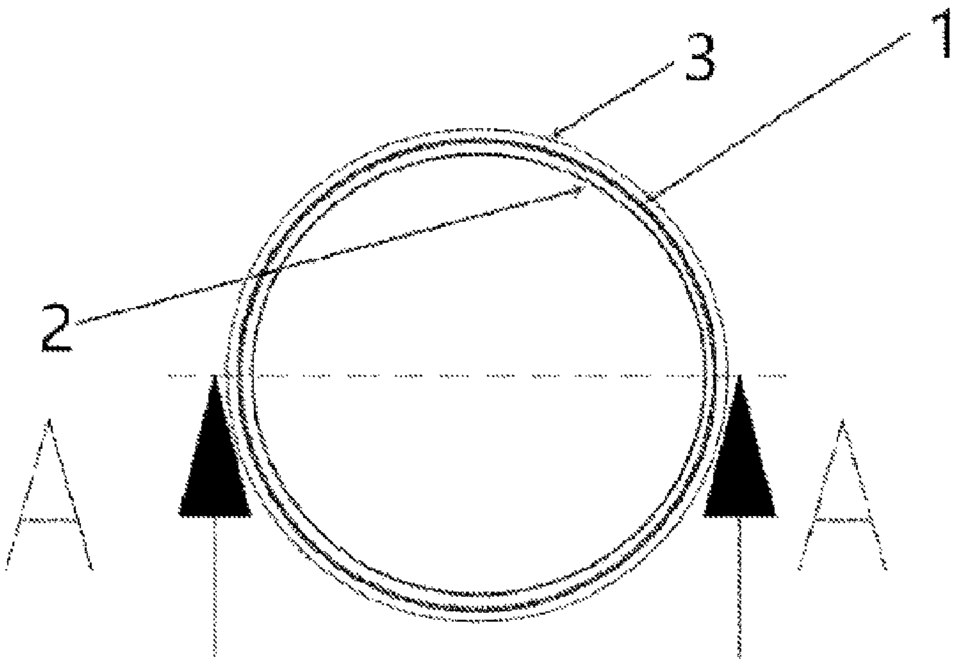
FIG. 2 is a top diagram of a voice coil for a sound producing device according to an embodiment of the present disclosure.
Figure 3:
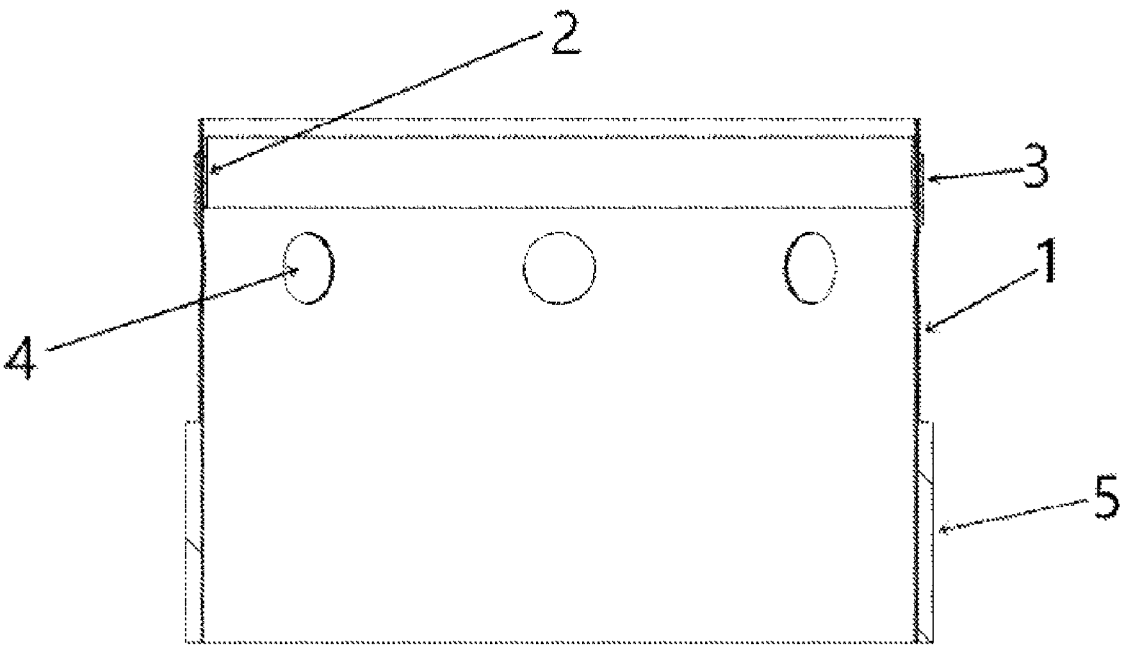
FIG. 3 is a cross-sectional diagram taken along A-A in FIG. 2 according to an embodiment of the present disclosure.

With reference to FIGS. 1 to 3, the present disclosure discloses a voice coil for a sound producing device comprising:

- a voice coil body including a voice coil framework 1 and a voice coil wire 5 wound on an outer side of the voice coil framework 1; and
- a reinforcing portion including a first reinforcing portion 2 disposed on an inner side of the voice coil framework 1 and a second reinforcing portion 3 disposed on the outer side of the voice coil framework 1,
- wherein the reinforcing portion is configured to enhance the strength of the voice coil at high frequencies.

The voice coil framework in the prior art is generally made of a single layer of aluminum magnesium alloy or polyimide film, and the outer side of the voice coil is additionally provided with a structure such as a layer of reinforcing paper to increase the strength of the voice coil. However, the voice coil framework having such structure has poor strength, and correspondingly affects the high frequencies acoustic performance of the loudspeaker. The present disclosure prevents the voice coil framework 1 from being deformed toward one side having weaker strength due to the relatively low strength of this side, by disposing the reinforcing portions on both the inner side and outer side of the voice coil framework 1. Furthermore, the present disclosure may enhance the strength of the voice coil at high frequencies, prevent the separation vibration generated by the voice coil at high frequencies, and finally apply the voice coil to the sound producing device, by further defining the material, thickness size and the arranging position of the reinforcing portion. The sound producing device may be a loudspeaker, and the voice coil reinforced by the reinforcing portions on the inner side and outer side may reduce the sound distortion of the sound producing device and improve the high frequencies acoustic performance of the sound producing device.

The conventional sound producing device generally operates at high frequencies within the scope of not exceeding 20 KHz, while the voice coil for the sound producing device of the present disclosure is configured to be able to operate at high frequencies within the scope of reaching 40 KHz, which greatly increases the high frequencies expansibility of the sound producing device.

Figure 6:
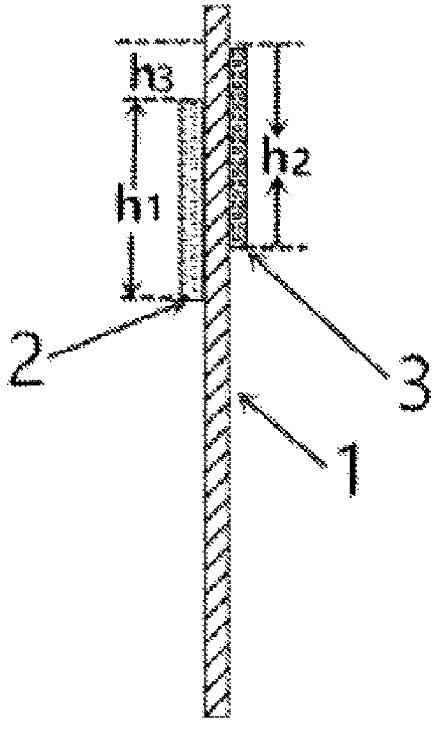
FIG. 6 is a structural schematic diagram of a voice coil framework and a reinforcing portion of a voice coil for a sound producing device according to still another embodiment of the present disclosure.

Optionally, with reference to FIG. 6, a width of the first reinforcing portion 2 in the axial direction of the voice coil framework 1 is $h_1$, and a width of the second reinforcing portion 3 in the axial direction of the voice coil framework 1 is $h_2$, and the $h_1$ is 5%-30% of the axial width of the voice coil framework 1.

The voice coil framework 1 is disposed in an annular shape, and thereby extends long in the axial direction thereof, and the voice coil framework 1 may be subjected to a great impact of vibration during the process of a vibration at high intensity and high frequencies. However, since the connection position between the voice coil framework 1 and the sound producing device is generally located on the upper portion of the voice coil framework 1, the upper portion of the voice coil framework 1 is subjected to the maximum impact of vibration, and thereby the stress concentrated on the upper portion of the voice coil framework 1 also increases, so that the upper portion of the voice coil framework 1 becomes the main damage vulnerable area. To this end, the first reinforcing portion 2 of which the width $h_1$ is 5%-30% of the width of the voice coil framework 1 in the axis direction is provided on the inner side of the upper portion of the voice coil framework 1 in the present disclosure, so as to intendedly increase the strength of the damage vulnerable area of the upper portion of the voice coil framework 1, and thereby protect the inner side of the upper portion of the voice coil framework 1.

Likewise, the $h_2$ may be 5%-30% of the width of the voice coil framework 1 in the axis direction. At outer side of the voice coil framework 1, the upper connection area is also the most damage vulnerable area, therefore the second reinforcing portion 3 of which the width $h_2$ is 5%-30% of the width of the voice coil framework 1 in the axis direction is provided on the outer side of the upper portion of the voice coil framework 1 in the present disclosure, so as to intendedly increase the strength of the damage vulnerable area of the upper portion of the voice coil framework 1, and thereby protect the outer side of the upper portion of the voice coil framework 1.

Optionally, an upper end of at least one of the first reinforcing portion 2 and the second reinforcing portion 3 is aligned with an upper end of the voice coil framework 1.

It should be understood that, in a specific embodiment, an upper end of the first reinforcing portion 2 is aligned with the upper end of the voice coil framework 1, so as to be able to ensure the inner side of the upper end of the voice coil framework 1 to have an enhanced structural strength from the uppermost end, and this structure extends down to the entire range across which the first reinforcing portion 2 is disposed, which further enhances the stability and reliability of the connection position between the voice coil framework 1 and the sound producing device. In another specific embodiment, it may be configured such that an upper end of the second reinforcing portion 3 is aligned with the upper end of the voice coil framework 1, so as to be able to ensure the outer side of the upper end of the voice coil framework 1 to have an enhanced structural strength from the uppermost end, and this structure extends down to the entire range across which the second reinforcing portion 3 is disposed, which enhances the stability and reliability of the connection position between the voice coil framework 1 and the sound producing device in the same manner.

Figure 4:
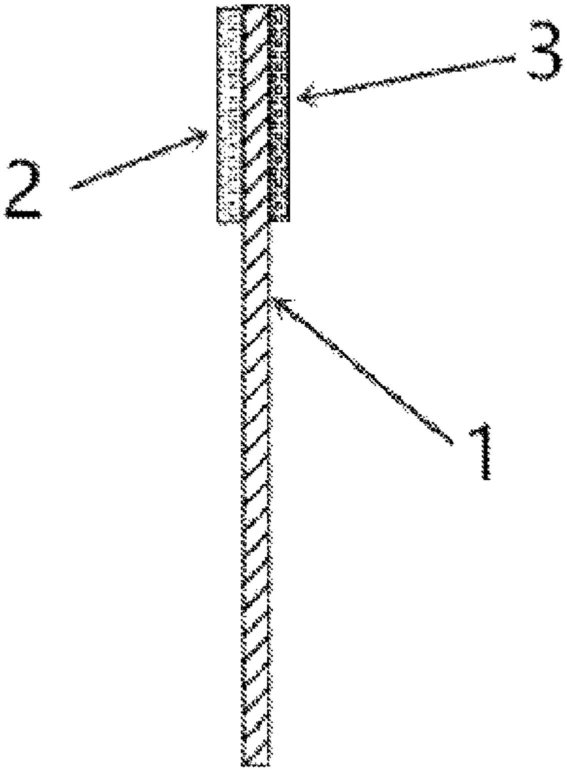
FIG. 4 is a structural schematic diagram of a voice coil framework and a reinforcing portion of a voice coil for a sound producing device according to an embodiment of the present disclosure.

In still another specific embodiment, with reference to FIG. 4, the upper end of the first reinforcing portion 2 and the upper end of the second reinforcing portion 3 are both aligned with the upper end of the voice coil framework 1, so as to be able to ensure both sides of the upper end of the voice coil framework 1 to have an enhanced structural strength from the uppermost end, and this structure extends down to the entire range across which the reinforcing portions are disposed, furthermore the reinforcements on both sides will not cause the bending and the deforming of the voice coil framework 1 toward the side at which the strength is weaker, so as to further enhance the strength of the upper portion of the voice coil framework 1, and ensure the strength and service life of the connection position between the voice coil framework 1 and the sound producing device.

Figure 5:
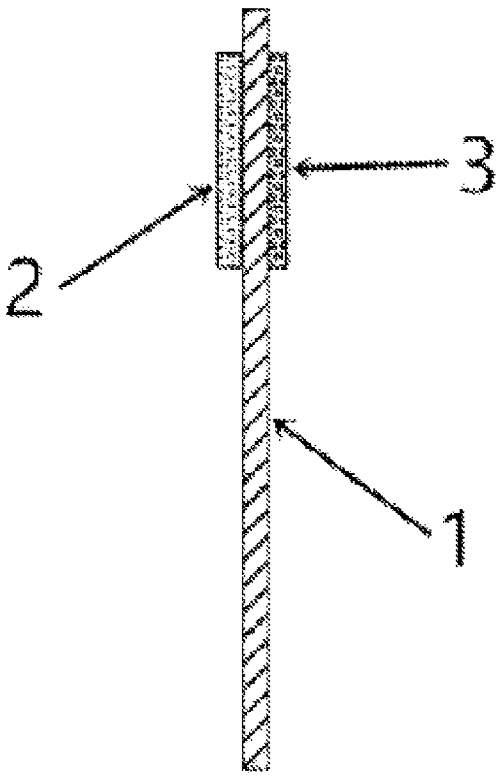
FIG. 5 is a structural schematic diagram of a voice coil framework and a reinforcing portion of a voice coil for a sound producing device according to another embodiment of the present disclosure.

Optionally, with reference to FIG. 5, the upper ends of the first reinforcing portion 2 and the second reinforcing portion 3 are both located lower than the upper end of the voice coil framework 1.

Since the voice coil is an important component of the sound producing device, the voice coil framework 1 might be required to bond with other components, and the bonding of the voice coil framework 1 with other components itself functions to enhance the structural strength of the voice coil framework 1. Therefore, it is necessary to reserve a bonding space at the upper end of the voice coil framework 1, and for this purpose, the upper ends of the first reinforcing portion 2 and the second reinforcing portion 3 are required to be disposed lower than the upper end of the voice coil framework 1.

Optionally, with reference to FIG. 6, the $h_1$ is equal to the $h_2$, that is, the width of the first reinforcing portion 2 in the axial direction of the voice coil framework 1 is equal to the width of the second reinforcing portion 3 in the axial direction of the voice coil framework 1, this arrangement has an arrangement of equalizing the reinforcing effect at the inner side and the reinforcing effect at the outer side of the voice coil framework 1 and preventing the voice coil framework 1 from bending and deforming towards the side at which the reinforcement is relatively weaker.

Optionally, with reference to FIGS. 4 and 5, the first reinforcing portion 2 and the second reinforcing portion 3 are symmetrically disposed on both sides of the voice coil framework 1.

The width of the first reinforcing portion 2 in the axial direction of the voice coil framework 1 is equal to the width of the second reinforcing portion 3 in the axial direction of the voice coil framework 1, on this basis, the reinforcing portion 2 and the second reinforcing portion 3 are symmetrically disposed on both sides of the voice coil framework 1, this arrangement further equalizes the strength at the inner side and the strength at the outer side of the voice coil framework 1, ensures the strength of the voice coil framework 1 during the reinforcement, and improves the strength of the voice coil at high frequencies.

Optionally, with reference to FIG. 6, the difference between the height of the first reinforcing portion 2 and the height of the second reinforcing portion 3 in the axial direction of the voice coil framework 1 is $h_3$, and the $h_3$ is 5%-80% of the $h_1$.

The difference between the height of the first reinforcing portion 2 and the height of the second reinforcing portion 3 in the axial direction of the voice coil framework 1 can increase the reinforcing the axial width of the voice coil framework 1. For example, when the $h_3$ is 50% of the $h_1$, that is, the portion where the first reinforcing portion 2 and the second reinforcing portion 3 overlap with each other to reinforce is half of the first reinforcing portion 2, that is, the overall reinforcement width of the voice coil framework 1 in the axial direction corresponds to half of the first reinforcing portion 2 and the whole of the second reinforcing portion 3, in this way, the reinforcement widths of the first reinforcing portion 2 and the second reinforcing portion 3 are combined, to finally achieve the effect of increasing the reinforcement width of the voice coil framework 1 in the axial direction.

However, the difference between the height of the first reinforcing portion 2 and the height of the second reinforcing portion 3 in the axial direction of the voice coil framework 1 should not be set too small. When the $h_3$ is less than 5% of the $h_1$, the purpose of increasing the reinforcement width of the voice coil framework 1 in the axial direction cannot be achieved, and when the $h_3$ is greater than 80% of the $h_1$, the reinforcement effect of the first reinforcing portion 2 and the second reinforcing portion 3 is equivalent to the case where the first reinforcing portion 2 and the second reinforcing portion 3 are disposed separately and independently, which cannot achieve the effect of complementing and reinforcing with each other.

Optionally, the material of the reinforcing portion is one or more of aluminum magnesium alloy, polyimide film, glass fiber and glue. Specifically, the material of the first reinforcing portion 2 may be the same as that of the second reinforcing portion 3.

Different reinforcing materials has different density, mechanical strength and connection strength, therefore, in order to ensure that the first reinforcing portion 2 and the second reinforcing portion 3 to achieve the same reinforcement effect on both sides of the voice coil framework 1, and enable the reinforcing effects of the first reinforcing portion 2 and the second reinforcing portion 3 to complement with each other, to function the effect of enhancing the strength of the voice coil together, it is necessary to configure the materials of the first reinforcing portion 2 and the second reinforcing portion 3 to be the same, both of which may be aluminum magnesium alloy material or polyimide film material, but are not limited in the present disclosure.

Obviously, the materials of the first reinforcing portion and the second reinforcing portion may also be different, and the first reinforcing portion 2 and the second reinforcing portion 3 may achieve the same reinforcement effect on both sides of the voice coil framework 1 by selecting the density and size of the reinforcement material.

Optionally, with reference to FIG. 2, the first reinforcing portion 2 is disposed in annular shape.

Since the voice coil framework 1 is disposed in annular shape, the first reinforcing portion 2 may be disposed in annular and fully attached on the inner side of the voice coil framework 1 in order to achieve the overall reinforcing effect on the inner side of the voice coil framework 1.

Obviously, the second reinforcing portion 3 may also be disposed in annular shape and fully attached on the outer side of the voice coil framework 1 so as to achieve the overall reinforcing effect on the outer side of the voice coil framework 1.

Optionally, a plurality of through holes 4 are disposed on a side wall of the voice coil framework 1, and the plurality of through holes 4 are uniformly disposed around the voice coil framework 1.

Specifically, the plurality of through holes 4 are disposed on the voice coil framework 1, and the through holes 4 are disposed in order to facilitate the connection between the voice coil and other components. For example, a centering support sheet may be connected to the voice coil through the through holes 4 to ensure the stable connection and effective vibration of the voice coil.

The present disclosure further discloses a sound producing device, which comprises a housing and a vibration assembly positioned inside the housing, wherein the vibration assembly comprises a diaphragm and the voice coil connected to the diaphragm.

The sound producing device may be a loudspeaker, including but not limited to a woofer, mid-range loudspeaker, tweeter and full-range loudspeaker. Particularly, in the configuration of mid-range loudspeaker and tweeter as well as full-range loudspeaker, the voice coil provided with reinforcing portions on both sides can significantly improve the acoustic performance of the loudspeaker at high frequencies and enhance the ductility of the loudspeaker at high frequencies.

Although some specific embodiments of the present disclosure have been described in detail by examples, those skilled in the art should understand that the above examples are only for illustration, not to limit the scope of the present disclosure. Those skilled in the art should understand that the above embodiments may be modified without departing from the scope and spirit of the present disclosure. The scope of the present disclosure is defined by the appended claims.

What is claimed is:

1. A voice coil for a sound producing device, comprising:

a voice coil body including a voice coil framework and a voice coil wire wound on an outer side of the voice coil framework; and a reinforcing portion including a first reinforcing portion disposed on an inner side of the voice coil framework and a second reinforcing portion disposed on the outer side of the voice coil framework, wherein the reinforcing portion is configured to enhance a strength of the voice coil at high frequencies, wherein a width of the first reinforcing portion in an axial direction of the voice coil framework is $h_1$, and the $h_1$ is 5%-30% of an axial width of the voice coil framework, wherein a width of the second reinforcing portion in the axial direction of the voice coil framework is $h_2$, and the $h_1$ is different from the $h_2$, and wherein a difference between a height of the first reinforcing portion and a height of the second reinforcing portion in the axial direction of the voice coil framework is $h_3$, and the $h_3$ is 5%-80% of the $h_1$.

2. The voice coil for the sound producing device of claim 1, wherein the first reinforcing portion and the second reinforcing portion are symmetrically disposed on both sides of the voice coil framework.

3. The voice coil for the sound producing device of claim 1, wherein material of the reinforcing portion is one or more of aluminum magnesium alloy, polyimide film, glass fiber and glue.

4. The voice coil for the sound producing device of claim 3, wherein material of the first reinforcing portion is the same as that of the second reinforcing portion.

5. The voice coil for the sound producing device of claim 1, wherein the first reinforcing portion is disposed in an annular shape.

6. The voice coil for the sound producing device of claim 1, wherein a plurality of through holes are disposed on a side wall of the voice coil framework, and the plurality of through holes are uniformly disposed around the voice coil framework.

7. A sound producing device, comprising a housing and a vibration assembly positioned inside the housing, wherein the vibration assembly comprises a diaphragm and the voice coil of claim 1 connected to the diaphragm.

8. The voice coil for the sound producing device of claim 1, wherein an upper end of at least one of the first reinforcing portion and the second reinforcing portion is aligned with an upper end of the voice coil framework.

* * * * *